US011024082B2

(12) United States Patent
Lee et al.

(10) Patent No.: US 11,024,082 B2
(45) Date of Patent: Jun. 1, 2021

(54) PASS-THROUGH DISPLAY OF CAPTURED IMAGERY

(71) Applicant: Google Inc., Mountain View, CA (US)

(72) Inventors: Johnny Chung Lee, Mountain View, CA (US); Steven B. Goldberg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 15/145,362

(22) Filed: May 3, 2016

(65) Prior Publication Data

US 2016/0328882 A1    Nov. 10, 2016

Related U.S. Application Data

(60) Provisional application No. 62/156,815, filed on May 4, 2015.

(51) Int. Cl.
*G06T 19/00* (2011.01)
*H04N 5/262* (2006.01)
(Continued)

(52) U.S. Cl.
CPC ........ *G06T 19/006* (2013.01); *G02B 27/0025* (2013.01); *G02B 27/0172* (2013.01);
(Continued)

(58) Field of Classification Search
CPC ..... G06T 19/006; G06T 5/006; H04N 13/344; H04N 13/366; H04N 5/2621;
(Continued)

(56) References Cited

U.S. PATENT DOCUMENTS 5,999,147 A    12/1999 Teitel
6,354,707 B1    3/2002 Jeon et al.
(Continued)

FOREIGN PATENT DOCUMENTS

CN    204101815 U    1/2015
JP    2002354505 A    12/2002
(Continued)

OTHER PUBLICATIONS

Communication Relating to the Results of the Partial International Search correlating to PCT/US16/030556 dated Jul. 21, 2016, 6 pages.

(Continued)

*Primary Examiner* — Xin Sheng

(57) ABSTRACT

A method includes sequentially outputting from an imaging sensor each pixel row of a set of pixel rows of an image captured by the imaging sensor. The method further includes displaying, at a display device, a pixel row representative of a first pixel row of the captured image prior to a second pixel row of the captured image being output by the imaging sensor. An apparatus includes an imaging sensor having a first lens that imparts a first type of spatial distortion, a display device coupled to the imaging sensor, the display to display imagery captured by the imaging sensor with the first spatial distortion, and an eyepiece lens aligned with the display, the eyepiece lens imparting a second type of spatial distortion that compensates for the first type of spatial distortion.

26 Claims, 9 Drawing Sheets

(51) Int. Cl.

| | | |
|---|---|---|
| *G06T 5/00* | (2006.01) | |
| *G02B 27/01* | (2006.01) | |
| *G02B 27/00* | (2006.01) | |
| *H04N 13/344* | (2018.01) | |
| *H04N 13/366* | (2018.01) | |

(52) U.S. Cl.
CPC ............ *G06T 5/006* (2013.01); *H04N 5/2621* (2013.01); *H04N 13/344* (2018.05); *H04N 13/366* (2018.05); *G02B 2027/011* (2013.01); *G02B 2027/014* (2013.01); *G02B 2027/0134* (2013.01); *G02B 2027/0138* (2013.01)

(58) Field of Classification Search
CPC ............ G02B 27/0025; G02B 27/0172; G02B 2027/011; G02B 2027/0134; G02B 2027/0138; G02B 2027/014
See application file for complete search history.

(56) References Cited

U.S. PATENT DOCUMENTS

| | | | |
|---|---|---|---|
| 7,889,261 B2 | 2/2011 | Shiozawa et al. | |
| 8,860,864 B2 | 10/2014 | Shiohara | |
| 9,628,766 B2 | 4/2017 | Tamayama et al. | |
| 2012/0081519 A1 | 4/2012 | Goma et al. | |
| 2013/0314546 A1* | 11/2013 | De Groot | H04N 5/23293 348/164 |
| 2014/0240469 A1* | 8/2014 | Lee | H04N 13/025 348/48 |
| 2014/0375679 A1* | 12/2014 | Margolis | G02B 27/017 345/633 |
| 2015/0029218 A1* | 1/2015 | Williams | G06T 19/006 345/633 |

FOREIGN PATENT DOCUMENTS

| | | |
|---|---|---|
| JP | 2009025919 A | 2/2009 |
| JP | 2013125138 | 6/2013 |
| JP | 2014093705 | 5/2014 |
| JP | 2014511606 | 5/2014 |
| WO | 2013125138 A1 | 8/2013 |

OTHER PUBLICATIONS

International Search and Written Opinion correlating to PCT/US16/030556 dated Sep. 14, 2016, 16 pages.
Translation of the First Office Action dated Sep. 15, 2018 for Japanese Application No. 2017-550729, 12 pages.
Chinese Office Action dated Nov. 21, 2019 for corresponding CN Application No. 201680019020, 23 pages (English translation included).
Office Action dated Aug. 4, 2020 for Japanese Patent Application No. 2017-550729, 9 pages.
English translation of Japanese Office Action dated Jan. 7, 2020 for corresponding JP Application No. 2017-550729, 3 pages.
European Examination Report dated Feb. 13, 2020 for corresponding EP Application No. 16723874.0, 5 pages.
European Examination Report dated Sep. 12, 2019 for corresponding EP Application No. 16723874.0, 6 pages.
English Translation of Chinese Office Action dated Apr. 17, 2020 for corresponding CN Application No. 201680019020, 20 pages.
English Translation of Chinese Office Action dated Feb. 27, 2019 for corresponding Chinese Application No. 201680019020.0, 26 pages.
International Preliminary Report on Patentability dated Nov. 16, 2017 for corresponding International Application No. PCT/US2016/030556, 11 pages.
English Translation of Japanese Office Action dated May 21, 2019 for corresponding JP Application No. 2017-550729, 3 pages.
Office Action dated Dec. 8, 2020 for European Patent Application No. 16723874.0-1209, 7 pages.
Notification of Re-Examination dated Jan. 8, 2021 for Chinese Patent Application No. 201680019020.0, 23 pages.

\* cited by examiner

PASS-THROUGH DISPLAY OF CAPTURED IMAGERY

CROSS REFERENCE TO RELATED APPLICATIONS

This application claims the benefit of U.S. Provisional Application No. 62/156,815, filed May 4, 2015, the entirety of which is incorporated by reference herein.

FIELD OF THE DISCLOSURE

The present disclosure relates generally to display systems and more particularly to the display of imagery captured via one or more imaging sensors in display systems.

BACKGROUND

Augmented reality (AR) display systems typically operate to capture imagery of a user's environment and then display a representation of the captured imagery on a display device, whereby the representation of the captured imagery may include augmented display information, such as an AR overlay, or a virtual reality (VR) representation of the captured imagery, such as a cartoon representation or computer-rendered representation of the real-life content in the captured imagery. In conventional AR display systems, after each image is captured, all of the pixels of the image are output and buffered together in a frame buffer, whereupon a processor processes the image as a whole from the frame buffer, and the resulting modified image is then output from the frame buffer to a display device for display of the modified image. This processing path introduces a substantial delay between the time that the image is captured and the time that a representation of the image is displayed. In many AR implementations, and particularly those in which the image capture device may be in motion, such as in a head mounted display (HMD) system, this delay can cause a perceptible lag between movement of the image capture device and display of a result of the movement in the display device, thus detracting from the user's experience.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

Figure 1:
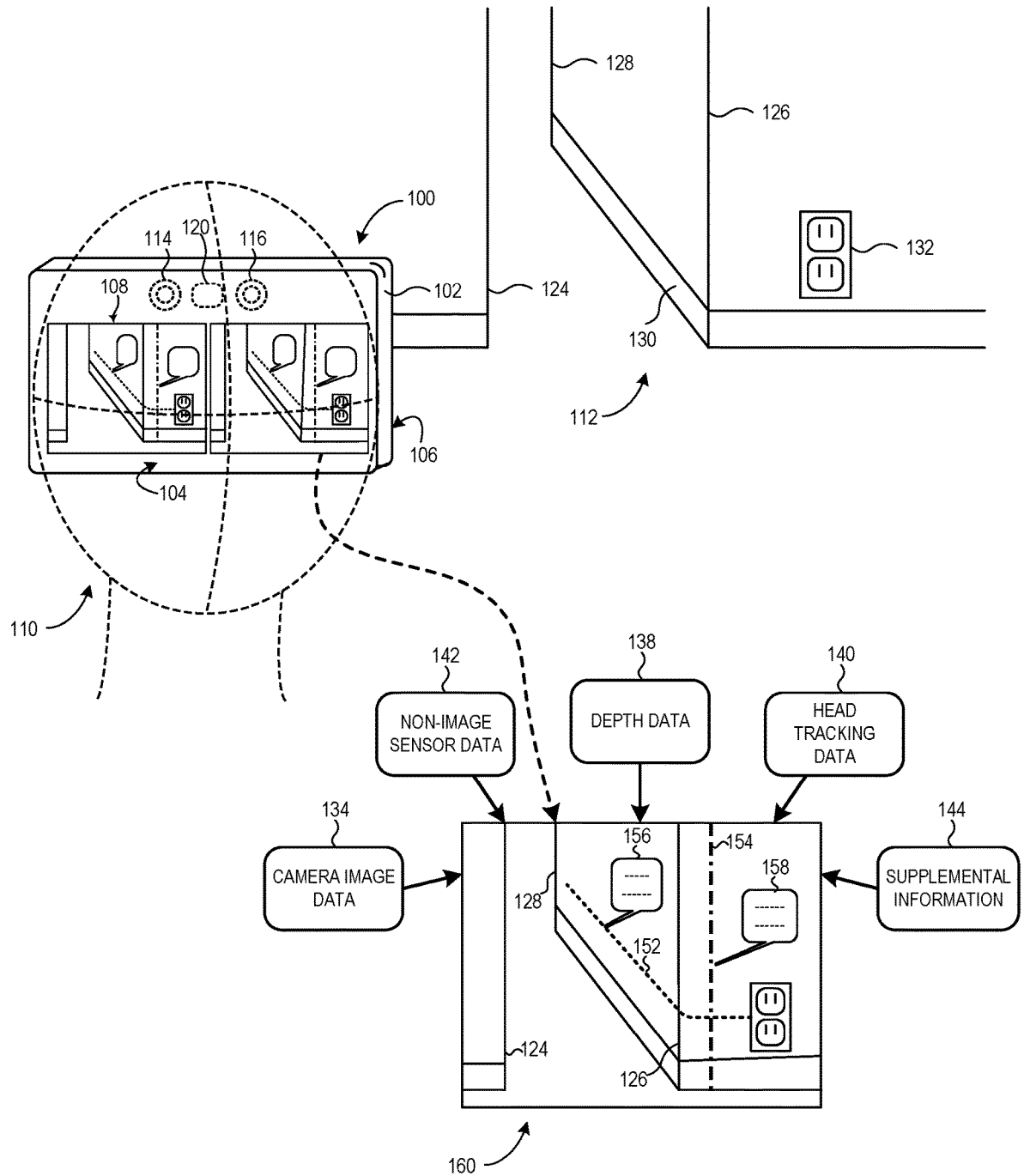
FIG. 1 is a diagram illustrating an electronic device providing augmented reality display using a line-locked display in accordance with at least one embodiment of the present disclosure.

The following description is intended to convey a thorough understanding of the present disclosure by providing a number of specific embodiments and details involving imagery capture and display systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

In concurrent capture/display systems, one or more imaging sensors are used to capture imagery (in the form of video) of the local environment, and this imagery is modified (e.g., to include an AR overlay or converted to a virtual-reality (VR) representation of the visual content or to incorporate certain filtering or warping modifications), and the resulting modified imagery is then displayed to a user. In conventional systems, the imagery processing/display path requires that each captured image (or frame) be buffered in its entirety in a frame buffer. Once the entire image is buffered in the frame buffer, a processor may perform one or more processes to modify the image content, such as by applying spatial or chromatic filters, application of an AR overlay, or conversion of the real-life content to representative VR content (e.g., "cartoon" versions of the objects in the image) to the entire image. The resulting modified image is then provided to a display device for display. This relatively long processing path introduces a significant latency between image capture and image display that often is perceptible to a user.

FIGS. 1-10 illustrate various techniques for efficient capture and display of imagery in display systems so as to reduce or minimize latency between image capture and image display. A display system implements one or more imaging sensors to capture imagery from the local environment and a display device that displays the captured imagery, or a modified representation thereof. Typically, the imaging sensors operate by exposing rows of pixel sensors to capture an image, and then the pixel data for each row of pixel sensors is shifted out in sequence. Rather than buffer all rows of pixel data (hereinafter "pixel rows") together before beginning the processing and subsequent display of the image, in at least one embodiment the display system initiates the processing and display of pixel rows of an image output by the imaging sensor before the last pixel row of the image is output by imaging sensor. To illustrate, in some embodiments the display system may temporarily buffer each pixel row as it is output from the imaging sensor in a small buffer that represents a "sliding window" of the output pixel row stream for the image, perform one or more efficient modification processes using the small subset of pixel rows stored at the buffer, and then access each modified pixel row in sequence from the buffer and drive a corresponding row of the display device with the accessed modified pixel row.

In this manner, after an initial brief period in which the buffer is filled with the initial pixel rows of the image, as each pixel row is output by the imaging sensor and buffered in the buffer, another pixel row is accessed from the buffer and displayed at a corresponding row of pixels of the display device. As such, this process is referred to herein as "pass-through display" and the configuration of a display device coupled to an imaging sensor so as to provide pass-through display is referred to as a "line-locked" display to reflect this one-to-one synchronization between output of a "line" (that is, a pixel row) from the imaging sensor and a corresponding line or row displayed at the display device. This pass-through display process avoids the need to buffer an entire image before beginning the image processing and subsequent display process, such that the lag between image capture and representative image display is significantly reduced compared to conventional display systems. Thus the pass-through display systems and techniques described herein provide an improved user experience compared to conventional display systems.

To illustrate, the latency in an image capture/display system may be understood as the time between when a photon of light is sampled by a sensor to the time a photon is presented to the user via the display. In conventional systems, this latency may be expressed as: Texp+Trow+(rows_frame*T_row)+Tsync+Tcompose+Tdisplay, where Texp is the exposure time of a pixel on the image sensor, Trow is the readout time of a single row from the sensor, rows_frame is the number of rows in the image frame, Tcompose is the time introduced by the compositor, Tsync is the time between a row being ready for output (fully adjusted for distortions and compositing) to the time the display controller is ready for that line, and Tdisplay which is the time required for the display controller to activate a pixel on the display. Described herein are example techniques that reduce, or minimize, the number of rows required to adjust for lens distortion or to implement other certain image modification techniques, and thus reduces the component (rows_frame*T_row) to (c_rows*T_row), where c_rows is the number of rows buffered from a frame in order to implement the desired modification algorithm on that portion of the frame. As such, the latency reduction achieved through these line-locked techniques may be expressed as (rows_frame−c_rows)*T_row. Moreover, because the image sensor may be frame synced to the display using the techniques described herein, the described techniques may also eliminate the contribution of Tsync to the latency between image capture and display.

FIG. 1 illustrates an electronic device 100 configured to provide AR or VR functionality via pass-through display in accordance with at least one embodiment of the present disclosure. The electronic device 100 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 100 can include a fixture device, such as medical imaging equipment, a security imaging sensor system, an industrial robot control system, a drone control system, and the like. For ease of illustration, the electronic device 100 is generally described herein in the example context of an HMD system; however, the electronic device 100 is not limited to these example implementations.

In the depicted example, the electronic device 100 includes a housing 102 having a surface 104 opposite another surface 106, as well as a set of straps or a harness (omitted from FIG. 1 for clarity) to mount the housing 102 on the head of a user 110 so that the user faces the surface 104 of the housing 102. In the example thin rectangular block form-factor depicted, the surfaces 104 and 106 are substantially parallel and the housing 102. The housing 102 may be implemented in many other form factors, and the surfaces 104 and 106 may have a non-parallel orientation. For the illustrated HMD system implementation, the electronic device 100 includes a display device 108 disposed at the surface 106 for presenting visual information to the user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via one or more imaging sensors, such as imaging sensors 114, 116, disposed at the forward-facing surface 106. In one embodiment, the imaging sensor 114 is implemented as a wide-angle imaging sensor having a fish-eye lens or other wide-angle lens to provide a wider angle view of the local environment 112 facing the surface 106, while the imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively.

The wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via multiview image analysis. Alternatively, a depth sensor 120 disposed on the surface 106 may be used to provide depth information for the objects in the local environment. The depth sensor 120, in one embodiment, uses a modulated light projector to project modulated light patterns from the forward-facing surface 106 into the local environment 112, and uses one or both of imaging sensors 114, 116 to capture reflections of the modulated light patterns as they reflect back from objects in the local environment 112. These modulated light patterns can be either spatially-modulated light patterns or temporally-modulated light patterns. The captured reflections of a modulated light flash are referred to herein as "depth images" or "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from multiview analysis (e.g., stereoscopic analysis) of the image data captured by the imaging sensors 114, 116. Alternatively, the depth data from the depth sensor 120 may be used in place of depth information obtained from multiview analysis.

One or more of the imaging sensors 114, 116 may serve other imaging functions for the electronic device 100 in addition to capturing imagery of the local environment 112. To illustrate, the imaging sensors 114, 116 may be used to support visual telemetry functionality, such as capturing imagery to support position and orientation detection. Further, in some embodiments, an imaging sensor (not shown) disposed at the user-facing surface 104 may be employed for tracking the movements of the head of the user 110 or for facial recognition, and thus providing head tracking information that may be used to adjust a view perspective of imagery presented via the display device 108. The electronic device 100 also may rely on non-image information for position/orientation detection. This non-image information can be obtained by the electronic device 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like.

In operation, the electronic device 100 captures imagery of the local environment 112 via one or both of the imaging sensors 114, 116, modifies or otherwise processes the captured imagery, and provides the processed captured imagery for display on the display device 108. The processing of the captured imagery can include, for example, spatial or chromatic filtering, addition of an AR overlay, conversion of the real-life content of the imagery to corresponding VR content, and the like. As shown in FIG. 1, in implementations with two imaging sensors, the imagery from the left side imaging sensor 114 may be processed and displayed in left side region of the display device 108 concurrent with the processing and display of the imagery from the right side imaging sensor 116 in a right side region of the display device 108, thereby enabling a stereoscopic 3D display of the captured imagery.

In addition to capturing imagery of the local environment 112 for display with AR or VR modification, in at least one embodiment the electronic device 100 uses the image sensor data and the non-image sensor data to determine a relative position/orientation of the electronic device 100, that is, a position/orientation relative to the local environment 112. This relative position/orientation information may be used by the electronic device 100 in support of simultaneous location and mapping (SLAM) functionality, visual odometry, or other location-based functionality. Further, the relative position/orientation information may support the generation of AR overlay information that is displayed in conjunction with the captured imagery, or in the generation of VR visual information that is displayed in representation of the captured imagery. As an example, the electronic device 100 can map the local environment 112 and then use this mapping to facilitate the user's navigation through the local environment 112, such as by displaying to the user a floor plan generated from the mapping information and an indicator of the user's current location relative to the floor plan as determined from the current relative position of the electronic device 100.

To this end, the determination of the relative position/orientation may be based on the detection of spatial features in image data captured by one or more of the imaging sensors 114, 116 and the determination of the position/orientation of the electronic device 100 relative to the detected spatial features. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the imaging sensors 114, 116 capture camera image data 134 that includes these spatial features of the hallway. In this example, the depth sensor 120 also captures depth data 138 that reflects the relative distances of these spatial features relative to the current position/orientation of the electronic device 100. Further, a user-facing imaging sensor (not shown) captures image data representing head tracking data 140 for the current position/orientation of the head of the user 110. Non-image sensor data 142, such as readings from a gyroscope, a magnetometer, an ambient light sensor, a keypad, a microphone, and the like, also is collected by the electronic device 100 in its current position/orientation.

From this input data, the electronic device 100 can determine its relative position/orientation without explicit absolute localization information from an external source. To illustrate, the electronic device 100 can perform multi-view analysis of the wide angle imaging sensor image data 134 and the narrow angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured image frames of the image data 134, determine the initial distances to these spatial features, and then track the changes in position and distances of these spatial features in subsequent captured imagery to determine the change in position/orientation of the electronic device 100. In this approach, certain non-image sensor data, such as gyroscopic data or accelerometer data, can be used to correlate spatial features observed in one image frame with spatial features observed in a subsequent image frame. Moreover, the relative position/orientation information obtained by the electronic device 100 can be combined with supplemental information 144 to present an AR view of the local environment 112 to the user 110 via the display device 108 of the electronic device 100. This supplemental information 144 can include one or more AR databases locally stored at the electronic device 100 or remotely accessible by the electronic device 100 via a wired or wireless network.

To illustrate, in the depicted example of FIG. 1, a local or remote database (not shown) stores position/orientation computer-aided drawing (CAD) information for electrical wiring embedded within the walls of the office represented by the local environment 112. Accordingly, the electronic device 100 can capture video imagery of a view of the local environment 112 via the imaging sensors 114, 116, determine a relative orientation/position of the electronic device 100, and determine the position and orientation of electrical wiring located within the walls present in the view of the local environment 112. The electronic device 100 then can generate a graphical AR overlay with visual representations of the electrical wiring positioned and oriented relative to corresponding spatial features (e.g., the corners 124, 126, and 128) identified in the video imagery. As illustrated in FIG. 1, the graphical AR overlay can include dashed lines 152 and 154 representing electrical wiring in the current view and description balloons 156 and 158 to provide descriptions of the electrical wiring, such as wiring type, an identifier associated with the wiring, and the building components powered by the corresponding wiring. The electronic device 100 then jointly presents the graphical overlay and the captured imagery at the display device 108 so as to present the user 110 with a graphical representation 160 of the location of electrical wiring within the current view of the local environment 112 as captured by the narrow angle imaging sensor 116. As the electronic device 100 moves relative to the previous view, the electronic device 100 updates the AR overlay so as to reflect the changed perspective. Moreover, the head tracking data 140 can be used to detect changes in the position of the head 122 of the user 110 relative to the display device 108, in response to which the electronic device 100 can adjust the displayed graphical representation 160 so as to reflect the changed viewing angle of the user 110 relative to the display device 108.

As another example, a local or remote AR database can be used to facilitate indoor navigation via the electronic device 100. To illustrate, the local environment 112 could represent the interior of a shopping mall and, in response to receiving user input indicating a desire to locate a certain store, the electronic device 100 can access the AR database to determine the location of the store relative to its current location. With this information, the electronic device 100 can display on top of the video imagery currently captured by one or more of the imaging sensors 114, 116 a graphical overlay that identifies the direction of the store relative to the current direction in which the electronic device 100 is pointed (e.g., via the display of "turn right", "turn left", "proceed straight ahead", or "turn around" arrow graphics).

In the example of FIG. 1, the electronic device 100 is implemented as an HMD system and thus the imaging sensors 114, 116 are subject to considerable motion due to movement by the user 110 through the local environment 112. Any perceptible delay between the capture of imagery while the electronic device 100 is in a particular position/orientation and the display of the captured imagery can significantly disorient the user 110. Accordingly, to reduce the delay between image capture and image display, in at least one embodiment the electronic device 100 provides pass-through display of the imagery captured by one or both of the imaging sensors 114, 116 such that as each image is captured by one of the imaging sensors and sequential output of each pixel row of the image begins by the imaging sensor, the electronic device 100 begins processing and display of pixel rows of the image before the last pixel row of the image is output by the imaging sensor. That is, after an inconsequential initial buffering delay, as each pixel row is output by the imaging sensor, a previously-output pixel row is displayed at the display device 108, thereby line-locking the display device 108 to one or both of the imaging sensors 114, 116. Example systems and techniques for this pass-through display process are described in greater detail below with reference to FIGS. 5-9.

Figure 2:
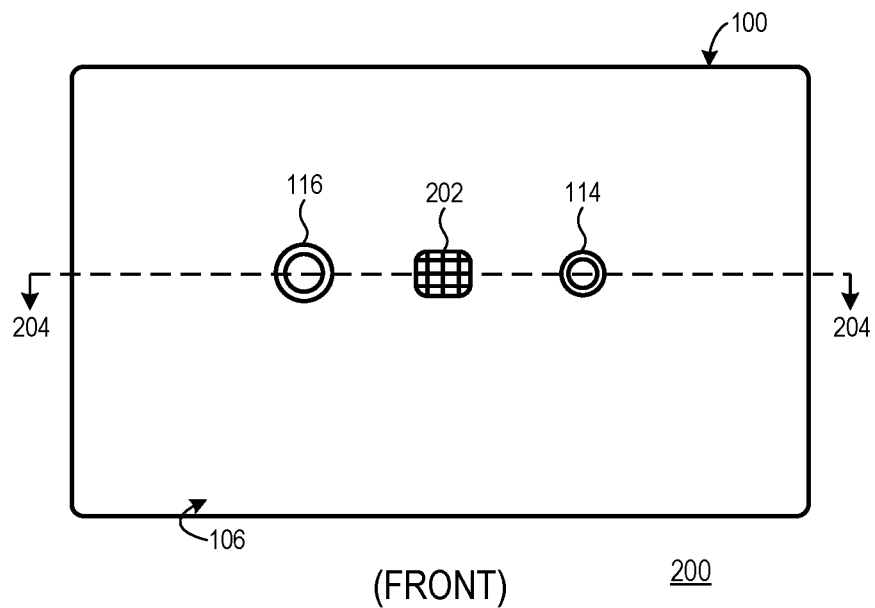
FIG. 2 is a diagram illustrating a front plan view of a head mounted display (HMD) implementation of an electronic device in accordance with at least one embodiment of the present disclosure.
Figure 3:
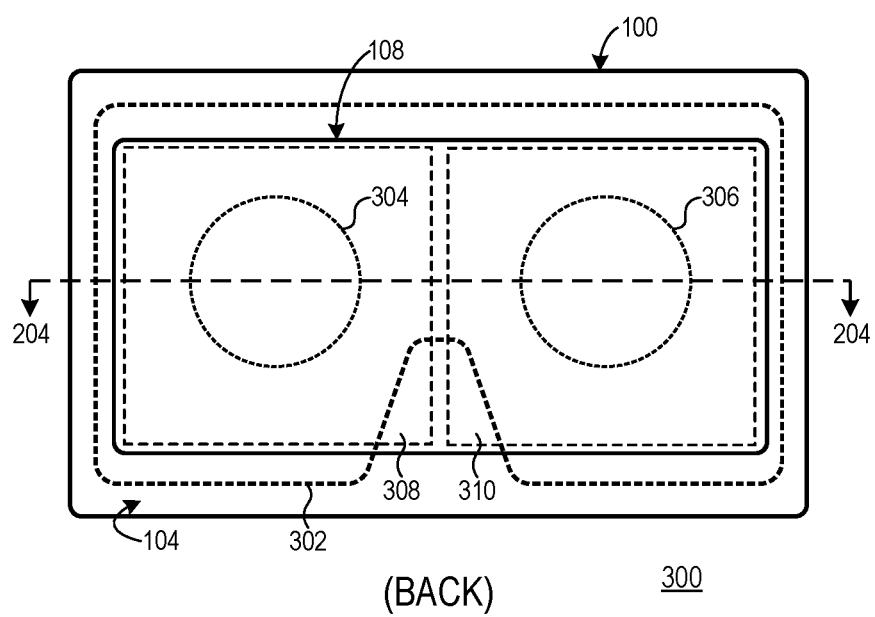
FIG. 3 is a diagram illustrating a back plan view of the HMD implementation of FIG. 2 in accordance with at least one embodiment of the present disclosure.

FIGS. 2 and 3 illustrate example front and back plan views of an example implementation of the electronic device 100 in a HMD form factor in accordance with at least one embodiment of the present disclosure. The electronic device 100 may be implemented in other form factors, such as a smart phone form factor, tablet form factor, a medical imaging device form factor, and the like, which implement configurations analogous to those illustrated.

As illustrated by the front plan view 200 of FIG. 2, the electronic device 100 can include the imaging sensors 114, 116, and a modulated light projector 202 of the depth sensor 120 disposed at the forward-facing surface 106. Although FIGS. 2 and 3 illustrate the imaging sensors 114, 116, and the modulated light projector 202 aligned along a straight line for the benefit of an example cross-section view in FIG. 4, the imaging sensors 114, 116 and the modulated light projector 202 may be offset relative to each other.

As illustrated by the back plan view 300 of FIG. 3, the electronic device 100 can include the display device 108 disposed at the surface 104, a face gasket 302 for securing the electronic device 100 to the face of the user 110 (along with the use of straps or a harness), and eyepiece lenses 304 and 306, one each for the left and right eyes of the user 110. As depicted in the back plan view 300, the eyepiece lens 304 is aligned with a left-side region 308 of the display area of the display device 108, while the eyepiece lens 306 is aligned with a right-side region 310 of the display area of the display device 108. Thus, in a stereoscopic display mode, imagery captured by the imaging sensor 114 may be displayed in the left-side region 308 and viewed by the user's left eye via the eyepiece lens 304 and imagery captured by the imaging sensor 116 may be displayed in the right-side region 310 and viewed by the user's right eye via the eyepiece lens 306.

Figure 4:
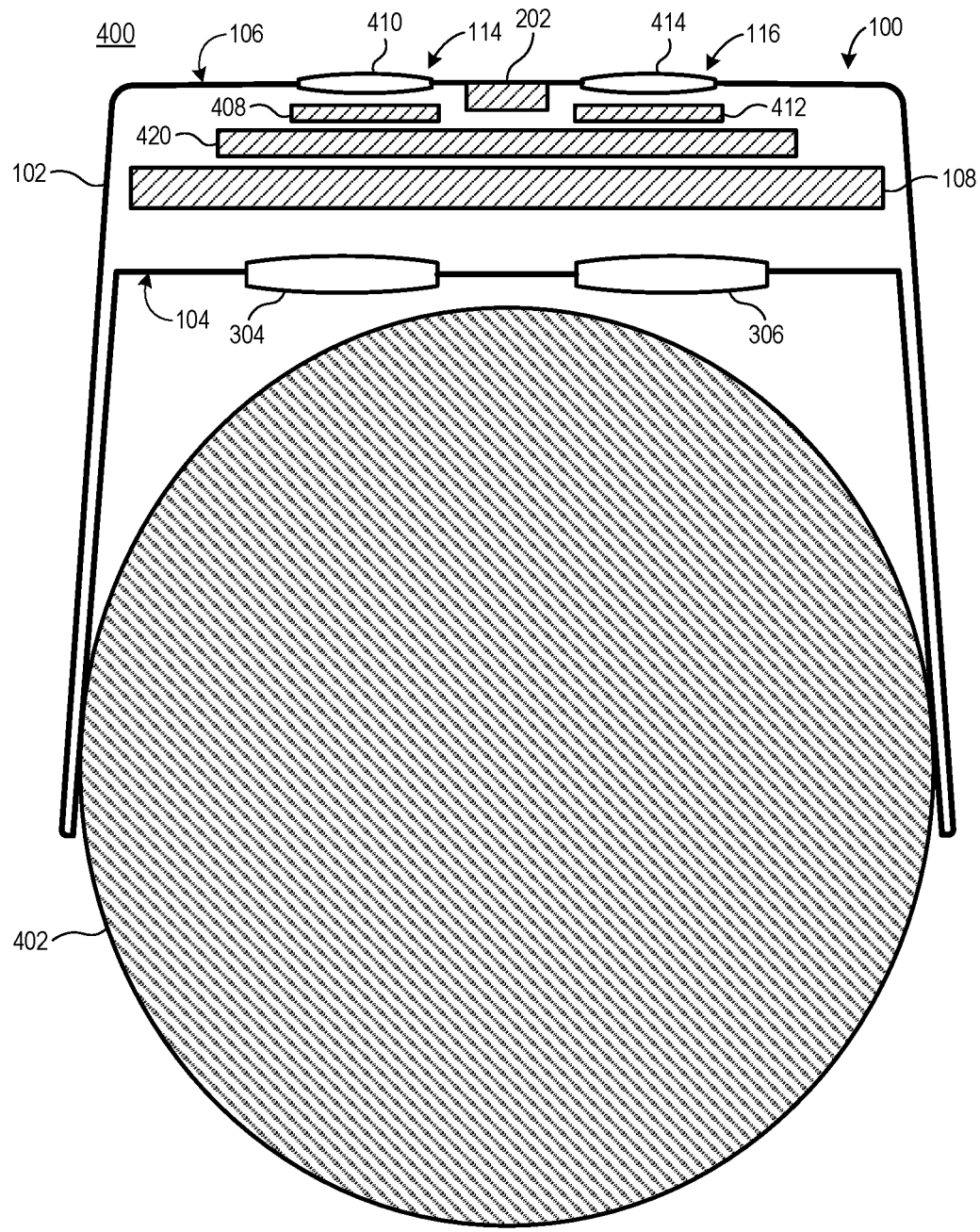
FIG. 4 is a diagram illustrating a cross-section view of the HMD implementation of FIG. 2 in accordance with at least one embodiment of the present disclosure.

FIG. 4 illustrates an example cross-section view 400 of the electronic device 100 as mounted on the head 402 of the user 110 along a line 204 depicted in the plan views of FIGS. 2 and 3 in accordance with at least one embodiment of the present disclosure. As illustrated, the electronic device 100 includes the imaging sensors 114, 116 and the modulated light projector 202 disposed in corresponding apertures or other openings in the forward-facing surface 106 of the housing 102, eyepiece lenses 304 and 306 disposed in corresponding apertures or other openings in the user-facing surface 104 of the housing 102, and the display device 108 disposed distal to the eyepiece lenses 304 and 306 within the housing 102. The imaging sensor 114 includes an image sensor 408 and one or more optical lenses 410 disposed over a sensing surface of the image sensor 408. Likewise, the imaging sensor 116 includes an image sensor 412 and one or more optical lenses 414 disposed over the sensing surface of the image sensor 412. The type of lens implemented for each imaging sensor depends on the intended function of the imaging sensor. For example, the lens 410 may be implemented as a wide-angle lens or a fish-eye lens having, for example, an angle of view between 160-180 degrees with a known high distortion, while the lens 414 of the imaging sensor 116 may be implemented as a narrow-angle lens having, for example, an angle of view between 80-90 degrees horizontally. Note that these angles of view are exemplary only.

In some embodiments some or all of the electronic components that control and support the operation of the imaging sensors 114, 116, the display device 108, and other components of the electronic device 100 may be implemented within the housing 102, as is represented by a block 420 in the cross-section view 400, and which are described in detail below with reference to FIG. 5. Although block 420 is depicted as a monolithic block for ease of illustration, it will be appreciated that these electronic components may be implemented either as a single package or component, or as a set of discrete, interconnected electronic components. Moreover, in some embodiments, some or all of these electronic components may be implemented remote to the housing 102. To illustrate, the processing components of the display system may be implemented in a separate device, such as a tablet computer, notebook computer, desktop computer, compute-enabled cellphone, and which is connected to a HMD incorporating the imaging sensors 114, 116 and the display device 108 via one or more wireless or wired connections.

Figure 5:
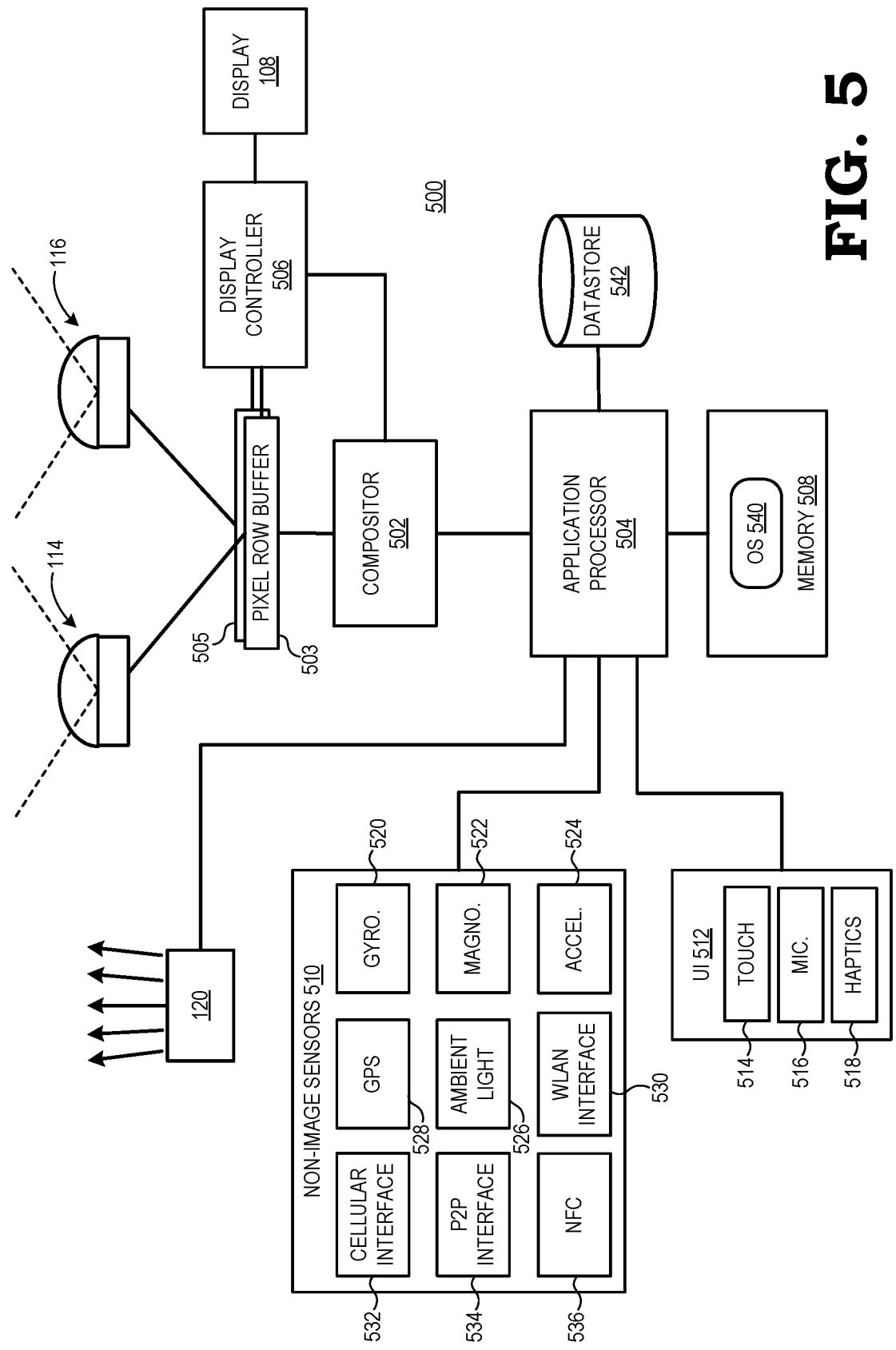
FIG. 5 is a block diagram illustrating a processing system of an electronic device having a line-locked display in accordance with at least one embodiment of the present disclosure.

FIG. 5 illustrates an example processing system 500 implemented by the electronic device 100 in accordance with at least one embodiment of the present disclosure. The processing system 500 includes the display device 108, the imaging sensors 114, 116, and the depth sensor 120. The processing system 800 further includes a compositor 502, pixel row buffers 503 and 505, an application processor 504, a display controller 506, a system memory 508, a set 510 of non-image sensors, and a user interface 512. The user interface 512 includes one or more components manipulated by a user to provide user input to the electronic device 100, such as a touchscreen 514, a mouse, a keyboard, a microphone 516, various buttons or switches, and various haptic actuators 518. The set 510 of non-image sensors can include any of a variety of sensors used to provide non-image context or state of the electronic device 100. Examples of such sensors include a gyroscope 520, a magnetometer 522, an accelerometer 524, and an ambient light sensor 526. The non-image sensors further can include various wireless reception or transmission based sensors, such as a GPS receiver 528, a wireless local area network (WLAN) interface 530, a cellular interface 532, a peer-to-peer (P2P) wireless interface 534, and a near field communications (NFC) interface 536. The non-image sensors also can include user input components of the user interface 512, such as the touchscreen 514 or the microphone 516.

The electronic device 100 further has access to various datastores 542 storing information or metadata used in conjunction with its image processing, location mapping, and location-utilization processes. The datastores 542 can include a spatial feature datastore to store metadata for 2D or 3D spatial features identified from imagery captured by the imaging sensors of the electronic device 100, a SLAM datastore that stores SLAM-based information, such as mapping information for areas of the local environment 112 (FIG. 1) already explored by the electronic device 100, an AR datastore that stores AR overlay information or VR information, such as CAD-based representations of the relative locations of objects of interest in the local environment 112. The datastores may be local to the electronic device 100, such as on a hard drive, solid state memory, or removable storage medium (not shown), the datastores may be remotely located at one or more servers and accessible via, for example, one or more of the wireless interfaces of the electronic device 100, or the datastores may be implemented as a combination of local and remote data storage.

In operation, the imaging sensors 114, 116 capture imagery of a local environment, the compositor 502 processes the captured imagery to produce modified imagery, and the display controller 506 controls the display device 108 to display the modified imagery at the display device 108. Concurrently, the application processor 504 executes an operating system (OS) 540 and other software programs to provide various functionality in combination with the captured imagery, such spatial feature detection processes to detect spatial features in the captured imagery or in depth information captured by the depth sensor 120, the detection of the current position/orientation of the electronic device 100 based on the detected spatial features or the non-sensor information provided by the set 510 of non-image sensors, the generation of AR overlays to be displayed in conjunction with the captured imagery, VR content to be displayed in addition to, or as a representation of the captured imagery, and the like.

As described in greater detail below with reference to FIGS. 6 and 7, in at least one embodiment, the processing system 500 employs the imaging sensors 114, 116 and the display device 108 in a line-locked configuration so as to enable pass-through display of imagery captured by the imaging sensors. In this implementation, each image captured by the imaging sensor 114 is shifted out on a row-by-row basis into the pixel row buffer 503, which operates to buffer the most recently output pixel row along with a subset of the pixel rows output prior to the most recently output pixel row. Likewise, each image captured by the imaging sensor 116 is shifted out on a row-by-row basis into the pixel row buffer 505, which operates to buffer the most recently output pixel row from the imaging sensor 116 along with a subset of the previously output pixel rows from the imaging sensor 116. Concurrently, the OS 540 or other computer program is executed by the application processor 504 to determine an AR overlay to be displayed in conjunction with each image and provides the resulting AR overlay information to the compositor 502. The compositor 502 modifies one or more pixel rows in the pixel row buffer to incorporate the AR overlay information associated with the corresponding locations of the pixel rows. The compositor 502 further may perform various additional image processing functions using the relatively small subset of buffered pixel rows, such as edge detection or other spatial filtering, chromatic filtering, and the like, using the pixel rows buffered in the corresponding pixel row buffer. As new pixel rows for a captured image are shifted into the pixel row buffer, processed pixel rows of the captured image are shifted out of the row buffer and provided to the display controller 506. The display controller 506 in turn manipulates the display device 108 to display the received modified pixel row. In this approach, the resulting modified representation of a captured image may begin being displayed before the captured image has completed output from the imaging sensor, thereby providing a reduced delay between image capture and display compared to conventional systems in which the entire image must be shifted out and buffered as a whole before display processing can begin.

The image sensors 408, 412 of the imaging sensors 114, 116 can be implemented as charge coupled device (CCD)-based sensors, complementary metal-oxide-semiconductor (CMOS) active pixel sensors, and the like. In a CMOS-based implementation, the image sensor may include a rolling shutter sensor whereby a subset of one or more rows of pixel sensors of the image sensor is read out while all other rows on the sensor continue to be exposed. This approach has the benefit of providing increased sensitivity due to the longer exposure times or more usable light sensitive area, but with the drawback of being subject to distortion due to high-speed objects being captured in the frame. The effect of distortion can be minimized by implementing a global reset mechanism in the rolling shutter so that all of the pixels on the sensor begin collecting charge simultaneously, rather than on a row-by-row basis. In a CCD-based implementation, the image sensor can be implemented as a global shutter sensor whereby all pixels of the sensor are exposed at the same time and then transferred to a shielded area that can then be shifted out on a row-by-row basis while the next image frame is being exposed. This approach has the benefit of being less susceptible to distortion, with the downside of generally decreased sensitivity due to the additional electronics required per pixel. Moreover, because the global reset mechanism introduces an artifact whereby the amount of exposure time of each row differs (with the total time of exposure decreasing from the top row to the bottom row) and because this difference changes linearly with exposure time given constant lighting conditions, the compositor 502 may adjust for this exposure difference by modifying the pixel rows in the pixel row buffers 503, 505 accordingly.

Figure 6:
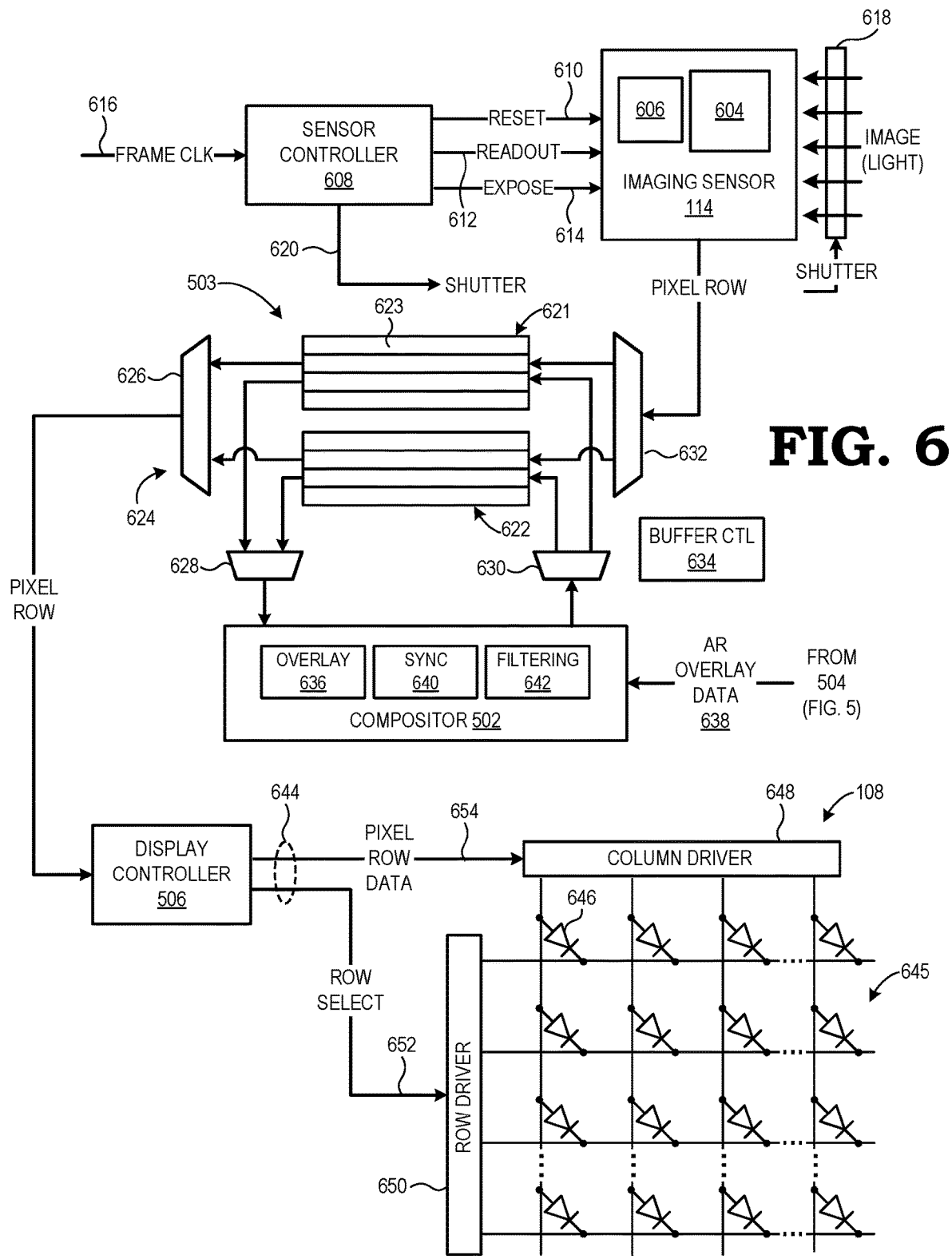
FIG. 6 is a block diagram illustrating a detailed view of a portion of the processing system of FIG. 5 in accordance with at least one embodiment of the present disclosure.

FIG. 6 illustrates the subsystem comprising the imaging sensor 114, the pixel row buffer 503, the compositor 502, the display controller 506, and the display device 108 in greater detail in accordance with at least one embodiment of the present disclosure. The imaging sensor 116 and the pixel row buffer 505 may be configured in a similar manner with respect to the compositor 502, the display controller 506, and the display device 108. In the depicted embodiment, the imaging sensor 114 comprises a sensor array 604 and array control logic 606. The sensor array 604 includes a set of pixel sensor rows (not shown), each pixel sensor row comprising circuitry to gather light for a corresponding row of pixels in the form of accumulated charge, with the accumulated charge captured at each pixel "position" in the pixel row representing the "image data" or "image content" for the pixel position within that pixel row for a corresponding image frame. The array control logic 606 controls the activation, termination, and readout of the image data from each pixel row responsive to various control signaling received from a sensor controller 608, including reset signaling 610, readout signaling 612, and expose signal 614 (denoted in FIG. 6 as "RESET", "READOUT", and "EXPOSE", respectively), as synchronized to a frame clock 616 (denoted in FIG. 6 as "FRAME_CLK"). In response to assertion of the reset signaling 610, the array control logic 606 affects a "global reset" of the sensor array 604, in which the circuitry of all of the pixel rows of the sensor array 604 is reset, thus clearing any accumulated charge present in the sensor array 604. In response to an assertion of the expose signal 614, the array control logic 606 initiates the opening of an overlying mechanical or electronic shutter 618 via assertion of a shutter signal 620, which exposes the pixel sensor rows so as to begin the accumulation of charge that represents the capture of image data for a corresponding image. In response to an assertion of the readout signaling 612, the array control logic 606 initiates the process of terminating exposure of each pixel row in the same sequence as the activation for exposure and initiates the process of shifting out the pixel data from the sensor array 604 from each pixel sensor row in sequence.

The pixel row buffer 503 has an input coupled to the output of the imaging sensor 114 to receive each pixel row output from the imaging sensor 114 in turn, a set of one or more buffer entries 623 (such as the four entries shown in FIG. 6), each to store a corresponding pixel row, and an output to provide processed pixel rows in sequential order. In the illustrated embodiment of FIG. 6, the pixel row buffer 503 has a double buffered implementation to avoid access collisions whereby the pixel row buffer 503 alternates between one copy 621 of the pixel row buffer entries and another copy 622 of the pixel row buffer entries for storing incoming pixel rows. The pixel row buffer 503 further includes switching circuitry 624, including the multiplexers 626, 628, 630, 632 and a buffer controller 634 to control the multiplexers, to facilitate access to the appropriate buffer entries 623 by the imaging sensor 114, the compositor 502, and the display controller 506.

The compositor 502 has inputs and outputs coupled to the pixel row buffer 503 via the switching circuitry 624. The compositor 502 operates to process the pixel rows buffered in the pixel buffer row copy that is not currently used to receive incoming pixel rows from the imaging sensor 114. To this end, the compositor 502 can include overlay circuitry 636 that is used to modify one or more buffered pixel rows to incorporate the image information for the corresponding image row locations in AR overlay data 638 received from the application processor 504 for the current image timeslot being processed. To ensure proper synchronization between display of images captured by the imaging sensor 114 and display of AR overlay information, the compositor 502 may include synchronization circuitry 640 that analyzes time stamp information provided as part of the AR overlay data 638 to ensure proper timing of incorporation of the AR overlay information. Further, the compositor 602 may include filtering circuitry 642 that is used to modify one or more buffered pixel rows through the application of one or more filtering processes, such as edge detection/sharpening, spatial distortion correction, chromatic distortion correction, and the like.

The display controller 506 has an input coupled to an output of the pixel row buffer 503 and at least one scan out line 644 coupled to the display device 108. As shown in FIG. 6, the display device 108 may be composed of an array 645 of display elements 646 (such as light emitting diodes (LEDs) or organic light emitting diodes (OLEDs)) selectively activated though a column driver 648 and a row driver 650. The display controller 506 receives each processed pixel row in sequence from the pixel row buffer 503 and, for each received pixel row, provides to the row driver 650 a row select indicator 652 indicating a row of the array 645 based on a row position of the received pixel row, and provides to the column driver 648 pixel row data 654 representing the pixel values of the pixels in the received pixel row. The row driver 650 and the column driver 648 then control their respective outputs to the array 645 based on these inputs so as to selectively activate display elements 646 in the corresponding row of the array 645 so as to display a representation of the pixel row at that row of array 645.

Although FIG. 6 illustrates an example implementation whereby output rows from the imaging sensor 114 are temporarily buffered in the pixel row buffer 503 for processing by the compositor 502, in some embodiments, the imaging sensor 114 may be directly coupled to the display controller 506 such that as each row is output it may be directly displayed by the display controller 506 in the corresponding row of the display 108. In such instances, the imaging sensor 114 is configured to output the pixel data in a format compatible with the display, or the display 108 is configured to accept the output format of the imaging sensor 114. To illustrate, many conventional imaging sensors typically output pixel data in the MIPI camera serial interface (CSI) format whereas displays typically are configured to accept display data in the MIPI display serial interface (DSI) format. Accordingly, in one implementation, the imaging sensor 114 could output pixel rows in the MIPI DSI format, or, alternatively the display 108 could be configured to accept pixel data in the MIPI CSI format.

Figure 7:
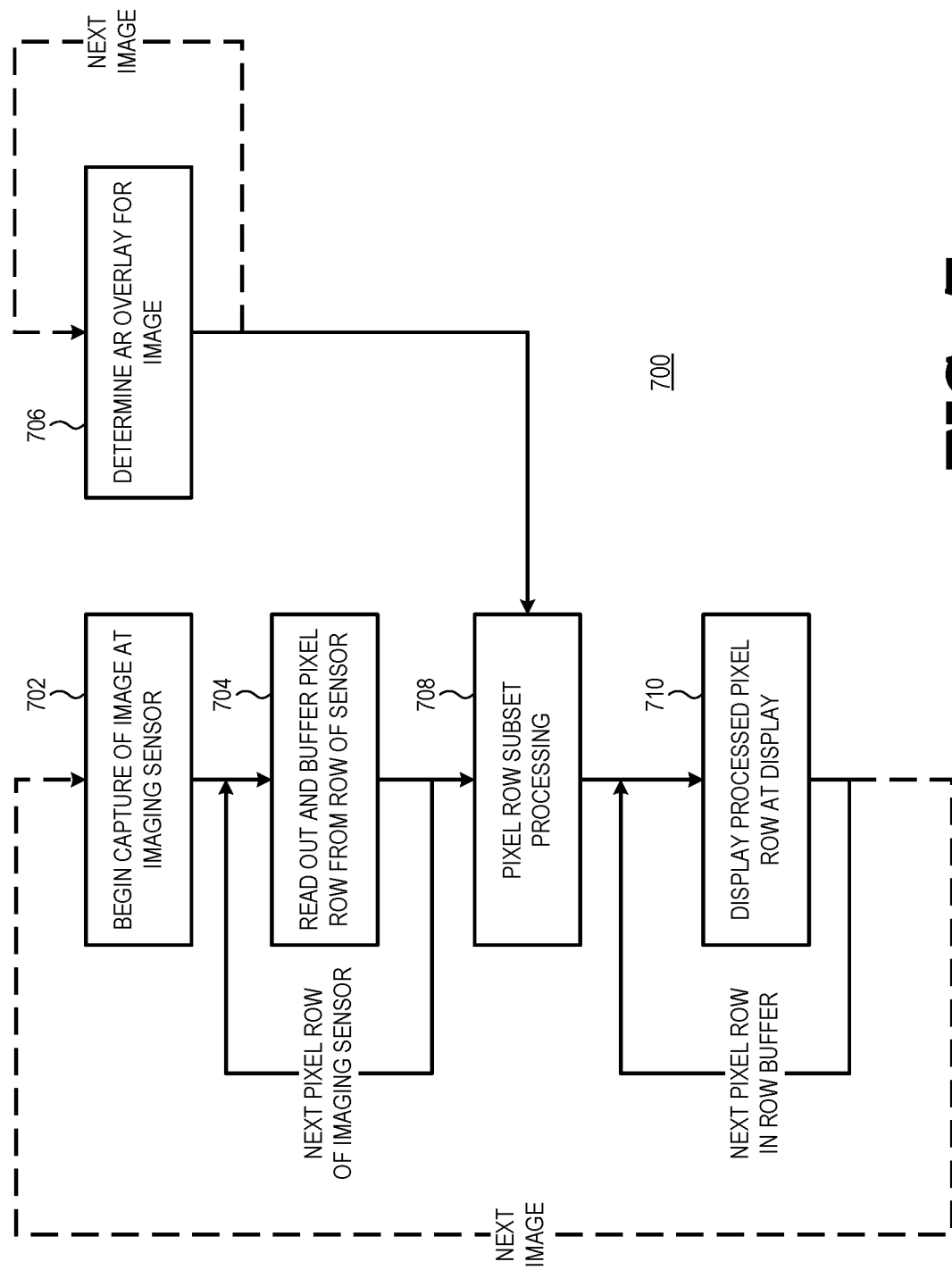
FIG. 7 is a flow diagram illustrating an operation of the processing system of FIGS. 5 and 6 for providing pass-through display of captured imagery using a line-locked display in accordance with at least one embodiment of the present disclosure.

FIG. 7 illustrates an example method 700 of operation for pass though display of imagery captured by an imaging sensor of the electronic device 100 in accordance with at least one embodiment. For ease of reference, the method 700 is described in the context of the example implementation of the processing system 500 of FIGS. 5 and 6. As noted above, the imaging sensors 114, 116 operate to capture imagery of the local environment in the form of a sequence of images (that is, video). The method 700 represents the process repeated by the electronic device 100 for each image in this sequence. Accordingly, the method 700 initiates at block 702 with the initiation of image capture by an imaging sensor (e.g., imaging sensor 114 for the following description). As noted above, the sensor controller 608 can initiate image capture by, for example, resetting the sensor array 604 via assertion of the reset signal 610 and then asserting the signal 614 to initiate exposure of the pixel sensor rows of the sensor array 604.

With the sensor array 604 exposed, at block 704 the sensor controller 608 initiates readout of the pixel rows of the image captured in the sensor array 604 by asserting the READOUT signal 612. In response to assertion of this signal, the array control logic 606 begins to shift out the data stored in each pixel sensor row in sequence. As each pixel row it output by the imaging sensor 114, it is buffered in a corresponding entry of the pixel row buffer 503. In the double buffered implementation of FIG. 6, the buffer controller 634 initially selects the copy 621 of the pixel row buffer 503 to start buffering pixel rows output by the imaging sensor 114. When all entries 623 of the copy 621 are filled, the buffer controller 634 switches to using the copy 622 of the pixel row buffer 503 for storing pixel rows incoming from the imaging sensor 114 and the copy 621 is then made available to the compositor 502 for processing of the pixel data stored therein. Subsequently, when all of the entries 623 of copy 622 have been filled with pixel rows, the buffer controller 634 invalidates all of the pixel rows stored in the copy 621 and then makes the copy 621 available to store the next subset of pixel rows incoming from the imaging sensor 114. At the same time, the buffer controller 634 makes the copy 622 available to the compositor 502 for processing of the buffered pixel data. This process of alternating between the copies 621 and 622 for pixel row storage and then subsequent processing repeats until all of the pixel rows of the image have been output by the imaging sensor.

Prior to, or during, the process of capturing an image, the OS 540 or other software program at the application processor 504 determines an AR overlay to be combined with the image being captured and provides the AR overlay data 638 representing this AR overlay to the compositor 502 at block 706. The content of the AR overlay may depend at least in part on a prediction of a position/orientation of the electronic device 100 at a time of capture or display of the image being output by the imaging sensor 114. To illustrate, the datastore 542 may store a 3D model of virtual objects for the local environment in which the electronic device 100 is operating, and the application processor 504 may predict the position and orientation of the electronic device 100 at an upcoming time T based on various inputs, such as spatial features detected in previously-captured imagery, orientation and momentum information from gyroscope and accelerometer readings, and the like, and from this predicted position and orientation the application processor 504 may render a view of certain virtual objects of the 3D model as they would appear from the predicted position and orientation. The application processor 504 thus may provide this rendered view as an application overlay to be incorporated into the captured image that is to be displayed at time T.

The buffer controller 634 switching between copies of the pixel row buffer 503 triggers, at block 708, the compositor 502 to begin processing the pixel data stored in the copy of the pixel row buffer 503 that has been switched away from currently buffering incoming pixel rows. This processing can include, for example, the overlay circuitry 636 of the compositor 502 incorporating into the buffered pixel rows the region of the AR overlay that corresponds to the row locations of the buffered pixels. In some embodiments, the application processor 504 determines the AR overlay for an image to be displayed at time T sufficiently prior to time T so that the AR overlay may be buffered in a frame buffer and the compositor 502 may access each row of the AR overlay from the frame buffer as it processes the corresponding buffered pixel row for the captured image. In other embodiments, the application processor 504 and the compositor 502 synchronize the AR overlay data such that the application processor 504 provides each row of the AR overlay synchronously with the processing of the corresponding pixel row of the captured image. In either instance, the synchronization circuitry 640 operates to access the timestamp information associated with each AR overlay to ensure that the AR overlay is synchronized to the correct captured image. The processing performed at block 708 further can include, for example, spatial filtering, chromatic filtering, edge sharpening, color base conversion, and the like.

After the compositor 502 has completed the processing of the buffered pixel rows in the selected copy of the pixel row buffer 503, at block 710 the buffer controller 634 initiates output of each pixel row in sequence from the selected copy of the pixel row buffer 503 to the display controller 506. The display controller 506, in turn, controls the display device 108 to display each received pixel row as a corresponding row, or line, of the array 645 of display elements 646.

With the output of the last pixel row of the captured image from the imaging sensor 114, the process flow returns to blocks 702 and 706 and another iteration of method 700 is performed by the electronic device 100 for the next image to be captured and displayed. As demonstrated by method 700, the electronic device 100 provides for pass-through display of captured imagery through the use of a display device that is line-locked to the imaging sensor capturing the imagery. Although a delay is initially introduced as the pixel row buffer 503 is filled with the initial subset of pixel rows output by the imaging sensor 114, this delay is insignificant relative to the typical human perception threshold. For example, assuming a high definition resolution of 1080 p (1080 rows), a refresh rate of 60 frames/second, and 4 pixel rows for the pixel row buffer 503, a pixel row is output at a rate of approximately one every 15 microseconds, and thus there is an initial delay of approximately 60 microseconds to initialize the pixel row buffer 503 with the first pixel rows out of the imaging sensor 114. This is an order of magnitude shorter than the typical shortest period of time shown to be perceptible to humans in a display context, and thus the lag introduced by this initial buffering delay and associated processing by the compositor 502 is imperceptible to the user 110.

Figure 8:
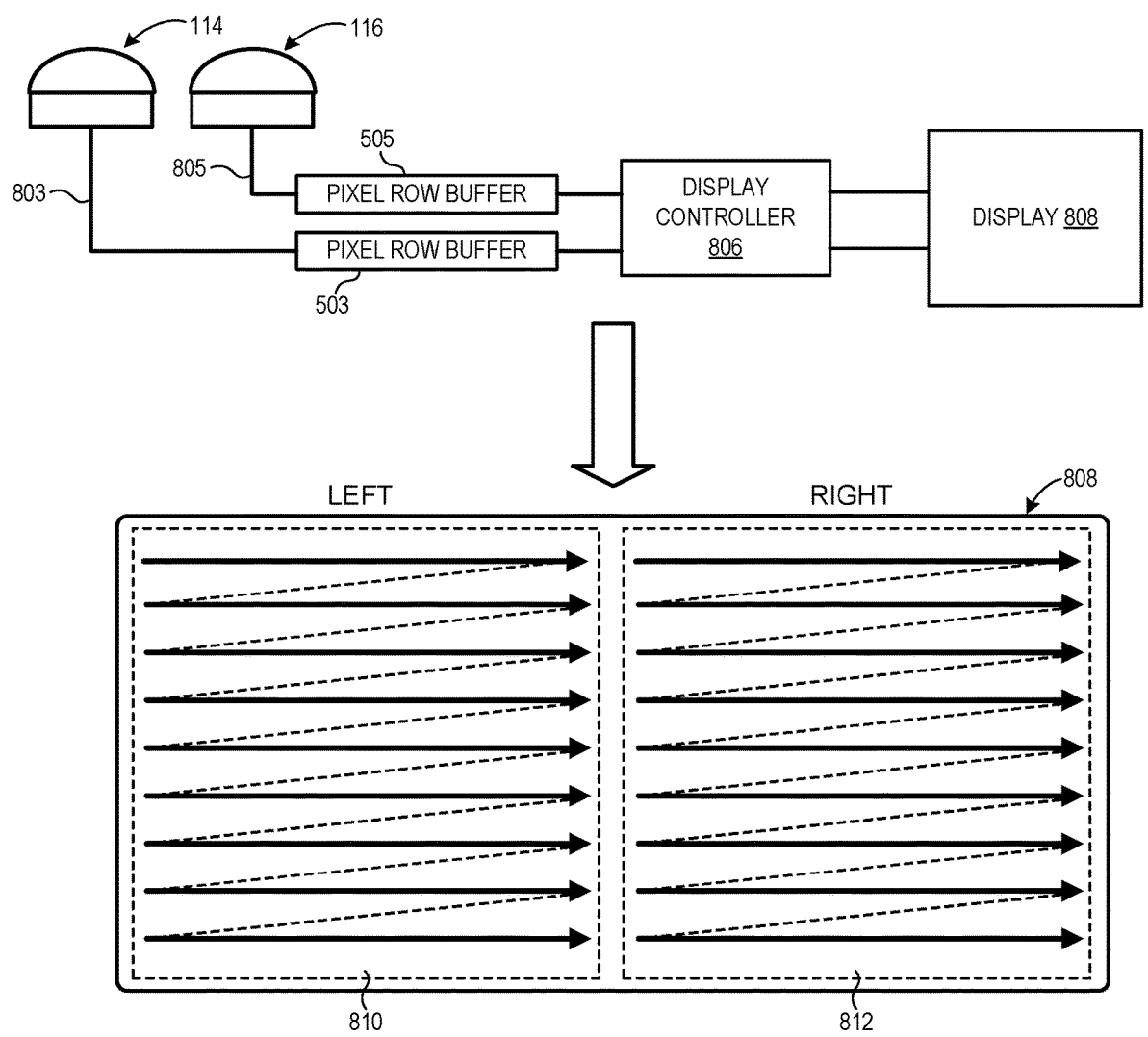
FIG. 8 is a diagram illustrating an operation of a stereoscopic HMD system for s display of two imagery streams at a line-locked display in accordance with at least one embodiment.
Figure 9:
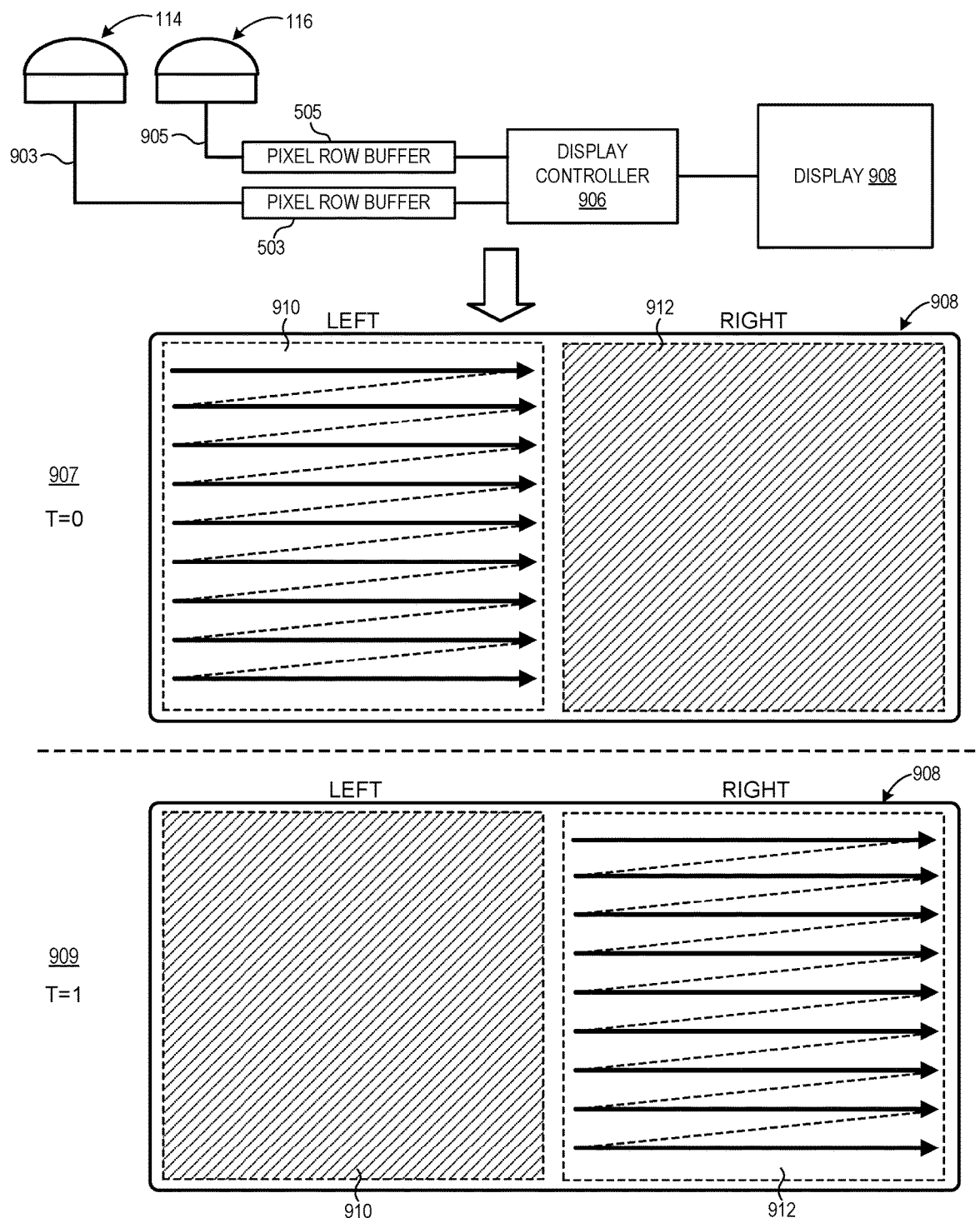
FIG. 9 is a diagram illustrating an operation of a stereoscopic HMD system for alternating display of two imagery streams at a line-locked display in accordance with at least one embodiment.

Although the examples are described in the context of the pass-through display of imagery captured by one imaging sensor, in many implementations the imagery captured by two or more imaging sensors may be displayed concurrently. FIGS. 8 and 9 illustrate example techniques for providing pass-through display in such implementations. FIG. 8 illustrates an example implementation of the electronic device 100 having the imaging sensors 114, 116, the pixel row buffers 503, 505, a display controller 806 (one embodiment of the display controller 506), and a display device 808 (one embodiment of the display device 108). In this implementation, the display controller 806 has two scan outputs and the display device 808 has two scan inputs, thereby allowing two pixel streams to be independently and concurrently displayed side-by-side in the display device 808. Alternatively, the display device 808 instead may be implemented as two side-by-side displays, each with a single scan input. As such, a sliding window of the pixel row stream 803 output by the imaging sensor 114 is buffered in the pixel row buffer 503, and the display controller 806 sequentially accesses the buffered pixel rows from the pixel row buffer 503 and drives the corresponding row in a left-side region 810 of the display device 808 (or a left-side display) in raster scan order. Concurrently, a sliding window of the pixel row stream 805 output by the imaging sensor 116 is buffered in the pixel row buffer 505, and the display controller 806 sequentially accesses the buffered pixel rows from the pixel row buffer 505 and drives the corresponding row in a right-side region 812 of the display device 808 (or a separate right-side display) in raster scan order. Thus, in this implementation, the display device 808 may simultaneously display captured images from both of the imaging sensors 114, 116.

FIG. 9 illustrates an alternative implementation of the electronic device 100 having the imaging sensors 114, 116, the pixel row buffers 503, 505, a display controller 906 (one embodiment of the display controller 506), and a display device 908 (one embodiment of the display device 108). In this implementation, the display controller 906 has a single scan input and the display device 908 has a single scan input. As such, only one image from the image cameras 114, 116 may be displayed on the display device 908 at any given time. In this instance, the image capture rate of the imaging sensors 114, 116 may be set to half the frame rate of the display device 908, and the display controller 906 may alternate between display of an image captured by the imaging sensor 114 and an image captured by the imaging sensor 116. As illustrated by view 907, when the imaging sensor 114 is selected at time 0, a pixel row stream 903 output by the imaging sensor 114 is buffered in the pixel row buffer 503, and the display controller 906 sequentially accesses the buffered pixel rows from the pixel row buffer 503 and drives the corresponding row in a left-side region 910 of the display device 908 in raster scan order. At the same time, the display controller 906 controls the display device 908 so that the display elements within the right-side region 912 remain inactive, thereby presenting a black, or blank, image to the user's right eye. Subsequently, as illustrated by view 909, when the imaging sensor 114 is selected next at time 1, a pixel row 905 output by the imaging sensor 116 is buffered in the pixel row buffer 503, and the display controller 906 sequentially accesses the buffered pixel rows from the pixel row buffer 505 and drives the corresponding row in the right-side region 912 of the display device 908 in raster scan order. At the same time, the display controller 906 controls the display device 908 so that the display elements within the left-side region 910 remain inactivated, thereby presenting a black, or blank, image to the user's left eye. Thus, in this implementation, the display device 808 may alternate between left eye and right eye display of images, with the other eye being presented a blank or black region. However, with a sufficiently high display rate, the blank/black region will be unperceivable to the user 110, and thus will not negatively impact the user's experience.

The optical lenses, such as those found in imaging sensors or those found in the eyepieces of head mounted display (HMD) implementations, typically introduce some form of spatial distortion into the display path, such as barrel distortion, pincushion distortion, or complex distortion (also referred to as "moustache distortion"). Conventionally, display systems can at least partially correct for these spatial distortions by performing one or more warp transforms on each buffered image so as to compensate for the spatial distortion either present in the buffered image or that will be introduced when the buffered image is viewed through the lenses in an eyepiece. However, the use of the pass-through display process described above can inhibit complete correction for such spatial distortions as either the warp transform requires more pixel rows than are buffered to be fully effective, or there is insufficient time to apply the warp transform in the time that the pixel row is buffered before being displayed. Accordingly, in some embodiments, the lenses in a HMD system implementation of the electronic device 100 or other implementation using at least two lenses in a display path may be selected so that the spatial distortion introduced by one of the lenses in the path is at least partially corrected or otherwise compensated for by a complementary spatial distortion introduced by the other lens in the path.

Figure 10:
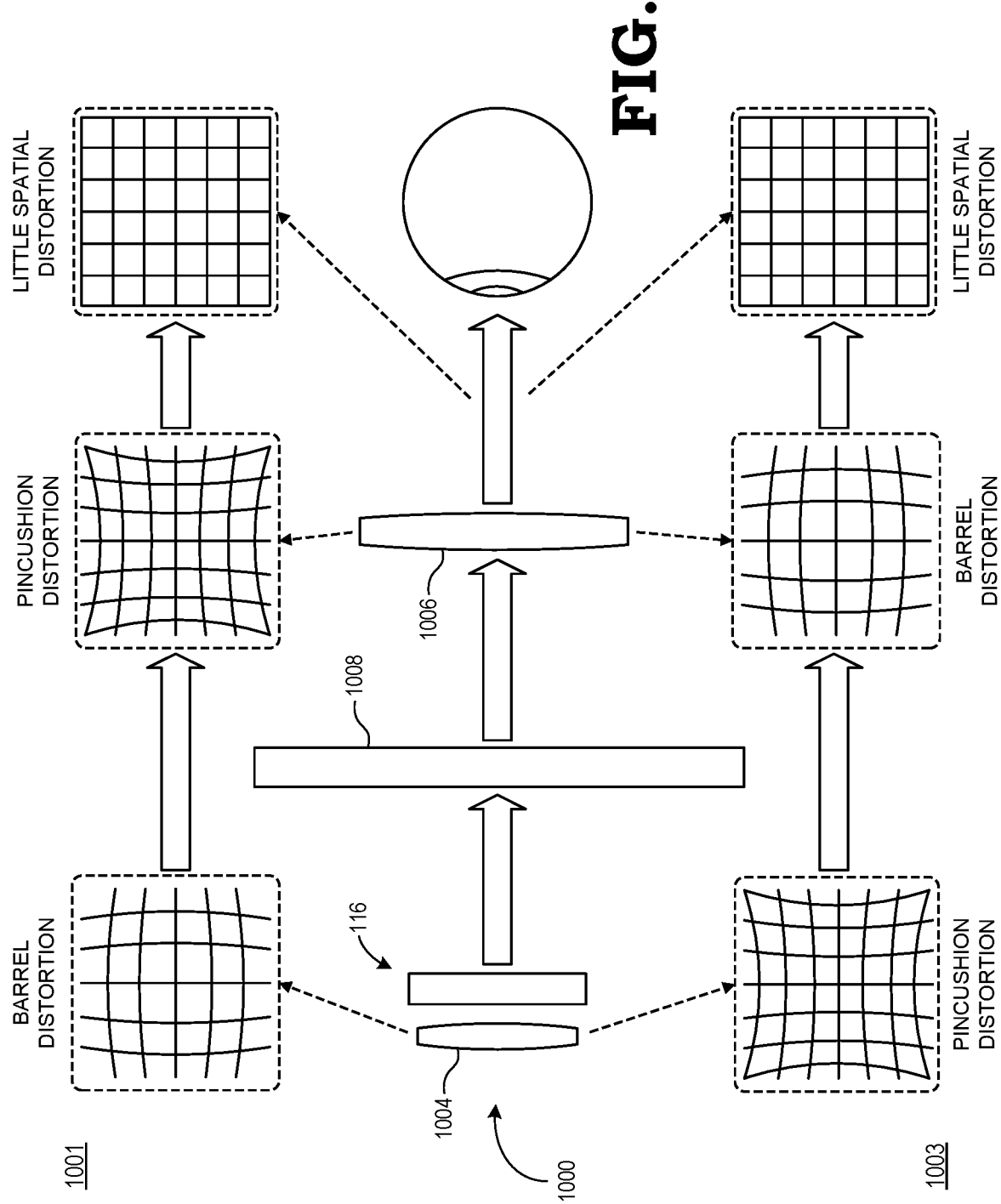
FIG. 10 is a diagram illustrating example implementations of an AR display system utilizing camera lenses and eyepiece lenses with complementary spatial distortion types in accordance with at least one embodiment.

FIG. 10 illustrates two example implementations of this complementary lens approach. For both scenarios, a display path 1000 of a pass-through display system has an imaging sensor 1002 with an optical camera lens 1004 (one embodiment of the imaging sensors 114, 116), a display device 1008 (one embodiment of display device 108) to display imagery captured by the imaging sensor 1002, and an eyepiece lens 1006 (one embodiment of the eyepiece lenses 304, 306) through which a user views the displayed imagery.

In the scenario 1001 depicted in the top half of FIG. 10, a wide angle lens is selected for implementation as the camera lens 1004 due to, for example, a designed use of the imaging sensor 1002 in support of machine vision uses. As wide angle lenses are prone to imparting barrel distortion, the imagery captured by the imaging sensor 1002 in this scenario is likely to impart barrel distortion into the captured imagery, and thus the display of the captured imagery also will exhibit a barrel distortion effect. Barrel distortion in an image may be at least partially corrected by viewing the image through a lens that imparts a pincushion distortion; that is, pincushion distortion is complementary to barrel distortion, and vice versa. Thus, to compensate optically for the barrel distortion introduced by the camera lens 1004, a lens which imparts a complementary degree of pincushion distortion can be selected for implementation as the eyepiece lens 1006. When a user views the displayed image through the eyepiece lens 1006, the barrel distortion in the displayed image from the camera lens 1004 is at least partially corrected by the pincushion distortion imparted by the eyepiece lens 1006.

In the scenario 1003 depicted in the bottom half of FIG. 10, a wide angle lens is selected for implementation as the eyepiece lens 1006 due to the focal distance between the eyepiece lens 1006 and the display device 1008. As noted, wide angle lenses are prone to barrel distortion, and thus an image displayed on the display device 1008 without any spatial distortion will exhibit barrel distortion when viewed through the eyepiece lens 1006. Thus, to compensate optically for the barrel distortion introduced by the eyepiece lens 1006 at the back end of the display path 1000, a lens that imparts pincushion distortion may be selected for implementation as the camera lens 1004. In this way, the camera lens 1004 "predistorts" the captured image and this predistortion is then nullified or corrected by the complementary barrel distortion imparted by the eyepiece lens 1006.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
sequentially outputting from a first imaging sensor each pixel row of a first set of pixel rows of a first image captured by the first imaging sensor;
buffering a subset of the first set of pixel rows in a buffer, the subset including a first pixel row of the first set of pixel rows;
modifying the subset of the first set of pixel rows in the buffer based on augmented reality overlay information associated with a position of the first pixel row to generate a pixel row representative of the first pixel row of the first image;
displaying, at a display device, the pixel row representative of the first pixel row of the first image prior to outputting subsequent rows from the first imaging sensor, the subsequent rows comprising a second pixel row of the first image; and
refraining from performing a second readout of a second image before a first readout of the first image completes.

2. The method of claim 1, wherein displaying the pixel row representative of the first pixel row comprises accessing the pixel row representative of the first pixel row from the buffer and driving a corresponding row of the display device with the accessed pixel row.

3. The method of claim 1, wherein modifying the buffered subset of the first set of pixel rows comprises:
receiving the augmented reality overlay information for one or more pixel rows of the subset of the first set of pixel rows from a remotely accessible augmented reality database.

4. The method of claim 1, wherein modifying the buffered subset of the first set of pixel rows comprises:
performing one or more filtering processes on the buffered subset of the first set of pixel rows.

5. The method of claim 4, wherein performing the one or more filtering processes comprises:
performing at least one of a spatial filtering process or a chromatic filtering process.

6. The method of claim 1, wherein buffering the subset of the first set of pixel rows in the buffer comprises:
buffering the first pixel row in a pixel row buffer, wherein displaying the pixel row representative of the first pixel row comprises:
accessing the pixel row representative of the first pixel row from the pixel row buffer; and
driving the display device with the accessed pixel row.

7. The method of claim 1, further comprising:
displaying, at the display device, a pixel row representative of a second pixel row prior to a third pixel row of the first image being output by the first imaging sensor.

8. The method of claim 1, further comprising:
sequentially outputting from a second imaging sensor each pixel row of a second set of pixel rows of a second image captured by the second imaging sensor; and
displaying, at the display device, a pixel row representative of a third pixel row of the second image prior to a fourth pixel row of the second image being output by the second imaging sensor.

9. The method of claim 8, wherein:
the first image is displayed in a first region of the display; and the second image is displayed in a second region of the display concurrent with the display of the first image.

10. The method of claim 8, wherein:
the first image is displayed in a first region of the display at a first time;
the second image is displayed in a second region of the display at a second time different than the first time;
the second region is inactive at the first time; and
the first region is inactive at the second time.

11. An apparatus comprising:
a first imaging sensor having an output to sequentially output pixel rows of a first captured image;
a memory buffer configured to receive a subset of a first set of pixel rows from the first imaging sensor, the subset including a first pixel row;
a compositor that includes overlay circuitry configured to modify the first pixel row of the subset of the first set of pixel rows in the memory buffer based on augmented reality overlay information to generate a pixel row representative of the first pixel row; and
a display controller coupled to the output of the first imaging sensor, the display controller to begin sequential display of pixel rows of the first captured image, including the first pixel row, at a display device before a last pixel row of the first captured image is output by the first imaging sensor, and refraining from performing a second readout of a second captured image before a first readout of the first captured image completes.

12. The apparatus of claim 11, further comprising:
a pixel row buffer coupled to the output of the first imaging sensor, the pixel row buffer having a plurality of entries to buffer a subset of the pixel rows of the first captured image in the memory buffer,
wherein the compositor is to generate a modified subset of pixel rows; and
wherein the display controller is coupled to the pixel row buffer, the display controller is to sequentially display the pixel rows of the first captured image by sequentially accessing each pixel row of the modified subset of pixel rows from the pixel row buffer and is to drive a corresponding row of the display device with the accessed pixel row.

13. The apparatus of claim 12, wherein:
the compositor further is to receive the augmented reality overlay information for one or more pixel rows of the subset of the first set of pixel rows.

14. The apparatus of claim 12, wherein:
the compositor is to modify the buffered subset of pixel rows by performing one or more filtering processes on the buffered subset of pixel rows.

15. The apparatus of claim 14, wherein the one or more filtering processes comprises at least one of a spatial filtering process or a chromatic filtering process.

16. The apparatus of claim 11, further comprising:
a pixel row buffer to buffer a first pixel row of the first captured image in a pixel row buffer, wherein the display controller is coupled to the pixel row buffer and is to display the pixel row representative of the first pixel row by accessing the pixel row representative of the first pixel row from the buffer and is to drive the display device with the accessed pixel row.

17. The apparatus of claim 11, wherein:
the display controller further is to display, at the display device, a pixel row representative of a second pixel row prior to a third pixel row of the first captured image being output by the first imaging sensor.

18. The apparatus of claim 11, further comprising:
a second imaging sensor having an output to sequentially output pixel rows of a second captured image, wherein the display controller is coupled to the second imaging sensor and further is to begin sequential display of pixel rows of the second captured image at the display device before a last pixel row of the second captured image is output by the second imaging sensor.

19. The apparatus of claim 18, wherein:
the display controller is to display the first captured image in a first region of the display to display the second captured image in a second region of the display concurrent with the display of the first captured image.

20. The apparatus of claim 18, wherein:
the display controller is to display the first captured image in a first region of the display at a first time;
the display controller is to display the second captured image in a second region of the display at a second time different than the first time;
the second region is inactive at the first time; and
the first region is inactive at the second time.

21. The apparatus of claim 11, further comprising:
an eyepiece lens aligned with the display, the eyepiece lens imparting a first type of spatial distortion, wherein the first imaging sensor comprises a lens that imparts a second type of spatial distortion that is complementary to the first type of spatial distortion.

22. A head mounted display system comprising the apparatus of claim 11.

23. An apparatus comprising:
an imaging sensor having a lens that imparts a first type of spatial distortion;
a buffer coupled to the imaging sensor, the buffer configured to receive a subset of a first set of pixel rows of the imaging sensor, the subset including a first pixel row;
overlay circuitry configured to modify the first pixel row in the buffer based on augmented reality overlay information to generate a pixel row representative of the first pixel row;
a display device coupled to the imaging sensor, the display device to display imagery including the first pixel row prior to a second pixel row captured by the imaging sensor with the first type of spatial distortion, and refraining from performing a second readout of a second display imagery before a first readout of the display imagery completes; and
an eyepiece lens aligned with the display, the eyepiece lens imparting a second type of spatial distortion that compensates for the first type of spatial distortion, the pixel row representative of the first pixel row visible through the eyepiece lens.

24. The apparatus of claim 23, wherein the first type of spatial distortion is barrel distortion and the second type of spatial distortion is pincushion distortion.

25. The apparatus of claim 23, wherein the first type of spatial distortion is pincushion distortion and the second type of spatial distortion is barrel distortion.

26. A head mounted display comprising the apparatus of claim 23.

* * * * *